United States Patent
McCloskey et al.

(10) Patent No.: US 6,569,985 B2
(45) Date of Patent: May 27, 2003

(54) METHOD FOR MAKING POLYCARBONATE

(75) Inventors: Patrick Joseph McCloskey, Watervliet, NY (US); Alberto Nisoli, Niskayuna, NY (US); Warren William Reilly, Northvillew, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/924,137

(22) Filed: Aug. 8, 2001

(65) Prior Publication Data
US 2003/0065129 A1 Apr. 3, 2003

(51) Int. Cl.$^7$ .............................................. C08G 64/00
(52) U.S. Cl. ....................................... 528/196; 528/198
(58) Field of Search .................................. 528/196, 198

(56) References Cited

U.S. PATENT DOCUMENTS

| | | |
|---|---|---|
| 5,026,817 A | 6/1991 | Sakashita et al. |
| 5,340,905 A | 8/1994 | Kuhling et al. |
| 5,399,659 A | 3/1995 | Kuhling et al. |
| 5,412,061 A | 5/1995 | King, Jr. et al. |
| 5,652,313 A | 7/1997 | Kuhling et al. |
| 5,767,224 A | 6/1998 | Kuhling et al. |
| 6,228,973 B1 | 5/2001 | McCloskey et al. |
| 6,414,106 B1 * | 7/2002 | Smigelski et al. .......... 528/196 |

* cited by examiner

Primary Examiner—Terressa M. Boykin
(74) Attorney, Agent, or Firm—Andrew C. Caruso; Noreen C. Johnson

(57) ABSTRACT

Polycarbonates having a high level of endcapping and containing a low level of Fries rearrangement product are prepared from dihydroxy aromatic compounds, such as bisphenol A, and diaryl carbonates such as diphenyl carbonate in a two stage process involving a tetraalkyl phosphonium carboxylate catalyzed oligomerization of the reactants in a first reaction stage followed by the addition of an alkali metal hydroxide co-catalyst in the second stage of the polymerization reaction. The late addition of the co-catalyst provides improved polymerization reaction rates as judged by higher polycarbonate molecular weights. The amount of alkali metal hydroxide co-catalyst is small thus avoiding the formation of excessive amounts of Fries product. The method has been used to provide Fries product levels between 200 and 800 parts per million in polycarbonates having $M_n$ values between 7,500 and 8,500 Daltons.

31 Claims, No Drawings

METHOD FOR MAKING POLYCARBONATE

BACKGROUND OF THE INVENTION

This invention relates to the melt preparation of polycarbonate using a two stage process in which a diaryl carbonate and dihydroxy aromatic compound are reacted together in a first reaction stage to provide a polycarbonate oligomer and thereafter, in a second stage, the polycarbonate oligomer is converted into a product polycarbonate. The process employs a tetraalkyl phosphonium carboxylate as a catalyst in the first reaction stage. An alkali metal hydroxide is added as a co-catalyst in the second reaction stage. The method provides a highly endcapped product polycarbonate comprising a lower level of Fries product than is provided by other known methods.

Increasingly, polycarbonate is being prepared by the melt reaction of a diaryl carbonate with a dihydroxy aromatic compound in the presence of a transesterification catalyst, such as sodium hydroxide. In this "melt" process, reactants are introduced into a reactor capable of stirring a viscous polycarbonate melt at temperatures in excess of 300° C. Typically, the reaction is run at reduced pressure to facilitate the removal of by-product aromatic hydroxy compound formed as the diaryl carbonate reacts with the dihydroxy aromatic compound and growing polymer chains. It is frequently desirable to prepare polycarbonates having a high level of endcapped polymer chain ends in order to promote polymer stability and to reduce the tendency to accumulate a static charge of molded articles prepared from the polycarbonate. Thus, it is desirable to maximize the percentage of polymer chains terminating with aryloxy groups, the "endcapped" chains, while minimizing the percentage of polymer chains terminating with hydroxyl groups.

The Fries rearrangement is a ubiquitous side reaction taking place during the preparation of polycarbonate using the "melt" process. The resultant "Fries product" serves as a site for branching of the polycarbonate chains thereby affecting flow and other properties of the polycarbonate. Although, a low level of Fries product may be tolerated in the product polycarbonate produced by the melt process, the presence of higher levels of Fries product may negatively impact performance characteristics of the polycarbonate such as moldability and toughness. Thus, melt polymerization methodology useful for the preparation of polycarbonate in which the formation of Fries product has been minimized represents a long sought goal among those wishing to practice such methodology.

It would be a significant advantage to prepare polycarbonate by a melt polymerization method which provides both a high level of endcapping and while minimizing the amount of Fries product formation.

BRIEF SUMMARY OF THE INVENTION

The present invention provides a method for making polycarbonate comprising contacting at least one diaryl carbonate with at least one dihydroxy aromatic compound in the presence of at least one tetraalkyl phosphonium carboxylate transesterification catalyst in a first reaction stage to afford a mixture comprising an oligomeric polycarbonate, said oligomeric polycarbonate having a number average molecular weight of less than about 3000 Daltons, and a phenolic by-product, and thereafter, in a second reaction stage, adding at least one alkali metal hydroxide transesterification co-catalyst to said mixture to afford a product polycarbonate having a number average molecular weight of at least 7500 Daltons.

The present invention further relates to a method for making polycarbonate having a high level of endcapping and a low level of Fries product.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of a diaryl carbonate with a dihydroxy aromatic compound.

As used herein the term "percent endcap" refers to the percentage of polycarbonate chain ends which are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

"BPA" is herein defined as bisphenol A or 2,2-bis(4-hydroxyphenyl)propane.

"Catalyst system" as used herein refers to the catalyst or catalysts that catalyze the transesterification of the dihydroxy aromatic compound with the diaryl carbonate in the preparation of melt polycarbonate.

"Catalytically effective amount" refers to the amount of the catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product affords carboxy bisphenol A, V, upon complete hydrolysis of the product polycarbonate.

The terms "Fries product" and "Fries group" are used interchangeably herein.

The terms "Fries reaction" and "Fries rearrangement" are used interchangeably herein.

As used herein the term "hydroxy aromatic compound" means a phenol, such as phenol or p-cresol, comprising a single reactive hydroxy group and is used interchangeably with the term "phenolic by-product".

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

In one aspect the present invention provides a method of preparing polycarbonate comprising structural units derived from at least one dihydroxy aromatic compound and at least one diaryl carbonate, said polycarbonate having a number average molecular weight of at least about 6,000 Daltons, preferably at least about 7,500 Daltons and comprising between about 200 and about 1000 parts per million, preferably between about 100 and about 1000 parts per million Fries product.

One aspect of the present invention comprises contacting at least one diaryl carbonate with at least one dihydroxy aromatic compound in the presence of at least one tetraalkyl phosphonium carboxylate transesterification catalyst in a first reaction stage to afford a mixture comprising an oligomeric polycarbonate and a phenolic by-product, and thereafter, in a second reaction stage, adding at least one alkali metal hydroxide transesterification catalyst to said mixture to afford a product polycarbonate having a number average molecular weight of at least about 6,000 Daltons, preferably at least about 7,500 Daltons.

In the first reaction stage the diaryl carbonate and dihydroxy aromatic compound are contacted in the presence of the tetraalkyl phosphonium carboxylate transesterification catalyst under conditions which effect transesterification reaction between the diaryl carbonate and the dihydroxy aromatic compound and result in the formation of an oligomeric polycarbonate having a number average molecular weight of less than about 3,000 Daltons. The reaction between the dihydroxy aromatic compound and the diaryl carbonate results in the formation of a by-product hydroxy aromatic compound which is distilled from the reaction mixture during the first and second reaction stages in order to drive the polymerization toward completion.

The first and second reaction stages of the process may be carried out in the same or different reaction vessels and may be run as batch or continuous processes. Any reaction vessel may be used, provided said vessel is one which may be heated, is adapted for removal of by-product hydroxy aromatic compound under vacuum, and which is equipped with a means for stirring a relatively low viscosity melt in the first reaction stage and viscous polymer melt in the second reaction stage. Glass lined reaction vessels which have been "passivated", meaning treated sequentially with acid and deionized water in order to remove adventitious catalysts, are preferred. Stirred tank reactors (STR's), continuous stirred tank reactors (CSTR's), horizontally aligned wiped film reactors, vertically aligned wiped film reactors, and tubular reactors comprising a means for mixing may be employed according to the method of the present invention.

According to the method of the present invention, at least one dihydroxy aromatic compound, at least one diaryl carbonate and at least one tetraalkyl phosphonium carboxylate transesterification catalyst are charged to a reactor and in a first reaction stage are reacted under conditions which comprise heating at a temperature in a range between about 150 and about 300° C., preferably between about 170 and about 280° C., and pressure of between about 2 atmospheres and about 1.0 mmHg, preferably between about atmospheric pressure and about 10 mmHg, for a time period of between about 15 minutes and about 3 hours, preferably between about 30 minutes and about 2 hours. The reaction which occurs during the first reaction stage provides an oligomeric polycarbonate comprising structural units derived from the diaryl carbonate and dihydroxy aromatic compound employed, and has a number average molecular weight, $M_n$, of less than about 3,000 Daltons. The diaryl carbonate and dihydroxy aromatic compound are employed in an amount corresponding to between about 0.90 and about 1.30, preferably between about 0.95 and about 1.20 moles diaryl carbonate per mole of dihydroxy aromatic compound. The tetraalkyl phosphonium carboxylate transesterification catalyst is employed in an amount corresponding to between about $1\times10^{-7}$ and about $1\times10^{-3}$, preferably between about $1\times10^{-6}$ and about $1\times10^{-3}$ moles of said tetraalkyl phosphonium carboxylate per mole of dihydroxy aromatic compound.

Following the first reaction stage, the reaction mixture comprising the oligomeric polycarbonate is further reacted, according to the method of the present invention, in a second reaction stage under conditions which comprise heating at a temperature in a range between about 250 and about 350° C., preferably between about 260 and about 310° C., and pressure of between about 100 mmHg and about 0.1 mmHg, preferably between about 15 mmHg and about 0.1 mmHg, for a time period of between about 15 minutes and about 3 hours, preferably between about 1 and about 2 hours. In addition to temperature and pressure regimes which differ from the temperature and pressure regimes employed in the first reaction stage, the second reaction stage comprises the addition of an alkali metal hydroxide co-catalyst to the reaction mixture. The alkali metal hydroxide co-catalyst is typically added at the beginning of the second reaction stage, but may be added at any time during the second reaction stage provided sufficient time remains during said second reaction stage for the catalytic effect of the alkali metal hydroxide co-catalyst to be manifested. The alkali metal hydroxide co-catalyst is added in any catalytically effective amount, however, it is advantageous to introduce as little of the co-catalyst as possible since alkali metal hydroxides are known to catalyze the Fries rearrangement in polycarbonates. Typically, the alkali metal hydroxide co-catalyst is employed in an amount corresponding to between about $1\times10^{-8}$ and about $1\times10^{-4}$, preferably between about $1\times10^{-8}$ and about $1\times10^{-5}$ moles alkali metal hydroxide per mole dihydroxy aromatic compound. A portion of the phenolic by-product generated during the first reaction stage is present during the second reaction stage. In addition, the polymerization reaction of the second reaction stage gives rise to additional phenolic by-product. Thus, the second reaction stage comprises distilling phenolic by-product from the reaction mixture in order to drive the polymerization reaction toward completion. The polymerization reaction which occurs during the second reaction stage provides a product polycarbonate comprising structural units derived from the diaryl carbonate and dihydroxy aromatic compound employed, and has a number average molecular weight, $M_n$, of at least about 6,000 Daltons, preferably at least about 7,500 Daltons.

In one embodiment, the product polycarbonate prepared according to the method of the present invention comprises between about 200 and about 1000, preferably between about 100 and about 1000 parts per million (ppm) Fries product, said Fries product furnishing upon complete hydrolysis of the product polycarbonate, a carboxy bisphenol having structure I

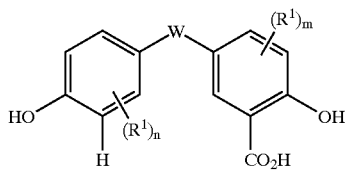

I wherein $R^1$ is at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–3; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

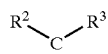

wherein $R^2$ and $R^3$ are independently a hydrogen atom, $C_1$–$_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$_{20}$ alkyl, $C_6$–$C_{20}$ aryl, $C_5$–$C_{21}$ aralkyl, $C_5$–$C_{20}$ cycloalkyl groups or a combination thereof.

Examples of carboxy bisphenols having structure I include 2-(3-carboxy-4-hydroxyphenyl)-2-(4-hydroxyphenyl)propane; 2-(3-carboxy-4-hydroxy-5-methylphenyl)-2-(4-hydroxy-3-methylphenyl)propane and 2-(3-carboxy-4-hydroxy-6-methylphenyl)-2-(4-hydroxy-2-methylphenyl)propane. The carboxy bisphenol designated 2-(3-carboxy-4-hydroxyphenyl)-2-(4-hydroxyphenyl)propane is also referred to as carboxy bisphenol A.

The transesterification catalyst employed in the first reaction stage is, according to the method of the present invention, a tetraalkyl phosphonium carboxylate having structure II

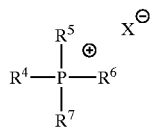

II wherein each of $R^4$–$R^7$ is independently a $C_1$–$C_{20}$ alkyl group and $X^-$ is an organic anion incorporating a carboxylate group.

In one embodiment of the present invention the anion $X^-$ is a carboxylate anion. Carboxylate anions are exemplified by the formate, acetate, propionate, butyrate, benzoate, oxalate, malonate, succinate and terephthalate anions. In some instances the tetraalkyl phosphonium carboxylate may comprise a mixture of anions, such as is a mixture of tetrabutyl phosphonium formate and tetrabutyl phosphonium acetate.

Examples tetraalkyl phosphonium carboxylates suitable for use according to the method of the present invention include tetramethyl phosphonium acetate, tetramethyl phosphonium propionate, tetraethyl phosphonium acetate, tetrapropyl phosphonium acetate, tetrapropyl phosphonium benzoate, tetraisopropyl phosphonium acetate, tetrabutyl phosphonium acetate, tetrabutyl phosphonium benzoate, tetrabutyl phosphonium forrnate, tetrabutyl phosphonium propionate, tetrabutyl phosphonium oxalate, tetrabutyl phosphonium malonate, tetrabutyl phosphonium succinate, and tetrabutyl phosphonium terephthalate. In one embodiment of the present invention a mixture of different tetraalkyl phosphonium carboxylates is employed, for example, a mixture of tetrabutyl phosphonium acetate and pentyltributyl phosphonium acetate.

Where $X^-$ is a polyvalent anion such as a dicarboxylate or a tricarboxylate it is understood that the positive and negative charges in structure II are properly balanced. For example, where $R^4$–$R^7$ in structure II are each butyl groups and $X^-$ is the oxalate dianion, it is understood that $X^-$ represents ½ $(C_2O_4^{-2})$.

The alkali metal hydroxide used in the second reaction stage may be any of the hydroxides of lithium, sodium, potassium, rubidium, and cesium. Sodium hydroxide is both a low cost and an effective co-catalyst.

Dihydroxy aromatic compounds suitable for use according to the method of the present invention include bisphenols having structure III

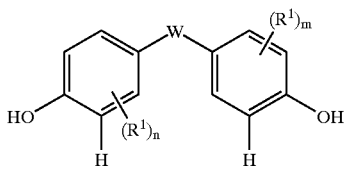

III wherein $R^1$, W, m and n are defined as in structure I.

Examples of bisphenols suitable for use according to the method of the present invention include bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

In one embodiment of the present invention a mixture of dihydroxy aromatic compounds is employed, for example a mixture of bisphenol A and 1,1-bis(4-hydroxyphenyl)-3,3,5-trimethylcyclohexane, to provide a product copolycarbonate comprising structural units derived from the referenced bisphenols, said copolycarbonate having a glass transition temperature greater than about 150° C. Where mixtures of dihydroxy aromatic compounds are employed the catalyst amounts are based upon the total number of moles of dihydroxy aromatic compound employed. Other examples of copolycarbonates which may be prepared according to the method of the present invention include copolycarbonates of bisphenol A with 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; and 1,1-bis(4-hydroxy-3-methylphenyl)cyclohexane.

Diaryl carbonates suitable for use according to the method of the present invention include diaryl carbonates having structure IV

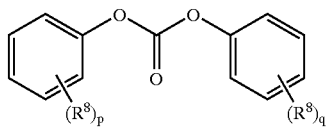

wherein $R^8$ is independently at each occurrence a halogen atom, nitro group, cyano group, $C_{1-20}$ alkyl group, $C_4-C_{20}$ cycloalkyl group, or $C_6-C_{20}$ aryl group; and p and q are independently integers 0–5.

Examples of diaryl carbonates suitable for use according to the method of the present invention include diphenyl carbonate, bis(4-methylphenyl) carbonate, bis(4-chlorophenyl) carbonate, bis(4-fluorophenyl) carbonate, bis(2-chlorophenyl) carbonate, bis(2-fluorophenyl) carbonate, bis(4-nitrophenyl) carbonate, bis(2-nitrophenyl) carbonate and the like.

The present invention provides a method for the preparation of a polycarbonate which is highly endcapped. This means that a substantial number of the polycarbonate chain ends are derived from the diaryl carbonate employed and not the bisphenol. Another way of expressing this idea is that a substantial number of the terminal groups are aryloxy groups, for example phenoxy, and not hydroxyl groups. In one embodiment the method the present invention provides a polycarbonate wherein less than about 40 percent, preferably less than about 30 percent, of the polycarbonate polymer chains terminate in hydroxyl groups.

In one embodiment, the method of the present invention may be used to prepare bisphenol A polycarbonate from bisphenol A and diphenyl carbonate, said embodiment comprising contacting diphenyl carbonate and bisphenol A in the presence of at least one tetraalkyl phosphonium carboxylate transesterification catalyst in a first reaction stage to afford a mixture comprising an oligomeric bisphenol A polycarbonate and phenol by-product, and thereafter, in a second reaction stage, adding at least one alkali metal hydroxide transesterification catalyst to said mixture to afford a product bisphenol A polycarbonate having a number average molecular weight of at least about 6,000 Daltons, preferably at least about 7500 Daltons.

The first reaction stage comprises heating at a temperature in a range between about 150 and about 300° C., preferably between about 170 and about 280° C., and pressure of between about 2 atmospheres and about 1.0 mmHg, preferably between about atmospheric pressure and about 10 mmHg, for a time period of between about 15 minutes and about 3 hours, preferably between about 30 minutes and about 2 hours. The oligomeric polycarbonate produced in the first reaction stage has a number average molecular weight of less than about 3,000 Daltons. The reaction mixture formed in the first reaction stage is then treated in a second reaction stage with an alkali metal hydroxide under conditions comprising heating at a temperature in a range between about 250 and about 350° C., preferably between about 260 and about 310° C., and pressure of between about 100 mmHg and about 0.1 mmHg, preferably between about 15 mmHg and about 0.1 mmHg, for a time period of between about 15 minutes and about 3 hours, preferably between about 1 and about 2 hours. The alkali metal hydroxide used in the second reaction stage is employed in an amount corresponding to between about $1 \times 10^{-8}$ and about $1 \times 10^{-4}$, preferably between about $1 \times 10^{-8}$ and about $1 \times 10^{-5}$ moles per mole bisphenol A. The phenol by-product formed in the first and second reaction stages is distilled from the reaction mixture during said first and second reaction stages in order to drive the polymerization reaction toward completion. The product bisphenol A polycarbonate obtained following the second reaction stage comprises between about 200 and about 1000 parts per million, preferably between about 100 and about 1000 parts per million Fries product said Fries product affording carboxy bisphenol A, structure V, upon complete hydrolysis of the product bisphenol A polycarbonate.

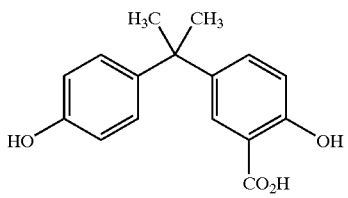

The tetraalkyl phosphonium carboxylate, II, may be used according to the method of the present of the present invention to prepare bisphenol A polycarbonate, said phosphonium carboxylate being used in an amount corresponding to between about, $1 \times 10^{-7}$ and about $1 \times 10^{-3}$, preferably between about $1 \times 10^{-6}$ and about $1 \times 10^{-3}$ moles per mole bisphenol A. In one embodiment of the present invention, bisphenol A polycarbonate is prepared using tetrabutyl phosphonium acetate as the tetraalkyl phosphonium carboxylate in the first reaction stage, and sodium hydroxide is used as the alkali metal hydroxide co-catalyst in the second reaction stage, said sodium hydroxide being used in an amount corresponding to between $1 \times 10^{-8}$ to $1 \times 10^{-5}$ moles per mole bisphenol A.

In one embodiment of the present invention bisphenol A polycarbonate is prepared using an amount of diphenyl carbonate corresponding to between about 0.90 and about 1.30, preferably between about 0.95 and about 1.20 moles diphenyl carbonate per mole bisphenol A.

Polycarbonates prepared using the method of the present invention may be blended with conventional additives such as heat stabilizers, mold release agents and UV stabilizers and molded into various molded articles such as optical disks, optical lenses, automobile lamp components and the like. Further, the polycarbonates prepared using the method of the present invention may be blended with other polymeric materials, for example, other polycarbonates, polyestercarbonates, polyesters and olefin polymers such as ABS.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Examples 1–3 and Comparative Examples 1–6

To facilitate observations and for purity melt transesterification reactions were carried out in a 1 Liter glass batch reactor equipped with a solid nickel helical agitator. The reactor bottom had a breakaway glass nipple for removal of the final melt. To remove any sodium from the glass the reactor was soaked in 3N HCl for at least 12 hours followed by a soak in 18 Mohm water for at least 12 hours. The reactor was then dried in an oven overnight and stored covered until use. The temperature of the reactor was maintained using a fluidised sand bath with a PID controller and measured near the reactor and sand bath interface. The pressure over the reactor was controlled by a nitrogen bleed into the vacuum pump downstream of the distillate collection flasks and measured at higher pressures (760 mmHg–40 mmHg) with a mercury barometer and at lower pressures (40 mmHg–1 mmHg) with an Edwards pirani gauge.

The reactor was charged with solid Bisphenol-A (General Electric Plastics Japan Ltd., 0.6570 mol) and solid Diphenyl carbonate (General Electric Plastics Japan Ltd., 0.7096 mol) prior to assembly. The reactor was then assembled, sealed and the atmosphere was exchanged with nitrogen three times. With the final nitrogen exchange the reactor was brought to near atmospheric pressure and submerged into the fluidised bath which was at 180° C. After five minutes agitation was begun at 250 rpm. After an additional ten minutes the reactants were fully melted and a homogeneous mixture was assumed. In Examples 1–3 and Comparative Examples 2 and 4 the transesterification catalyst, tetrabutyl phosphonium acetate (Sachem, $1.32 \times 10^{-4}$ mole) was added as an aqueous solution at this point. In Comparative Examples 1, 3, 5 and 6 the transesterification catalyst tetramethyl ammonium hydroxide, TMAH, (Sachem, $1.32 \times 10^{-4}$ mole) was added as an aqueous solution at this point. In Comparative Examples 3 and 4 aqueous sodium hydroxide was added together with the TMAH in an amount equivalent to $1 \times 10^{-6}$ moles NaOH per mole bisphenol A. After the catalyst addition the temperature was raised to 230° C. over a five minute period. The pressure was then reduced to 180 mmHg and phenol began to distill from the reaction mixture. After 25 minutes the pressure was reduced to 100 mmHg and the reaction mixture was maintained at 230° C. and 100 mmHg for 45 minutes. In Examples 1–3, at this stage the reaction mixture comprises an oligomeric polycarbonate having $M_n$ less than about 3,000 Daltons. The temperature was then raised to 260° C. over a five minute period and the pressure was lowered to 15 mmHg. When the reaction mixture reached 260° C. an aqueous solution of sodium hydroxide was added to the reaction mixture in Examples 1–3 and Comparative Examples 5 and 6. These conditions were maintained for 45 minutes. The temperature was then raised to 270° C. over a five minute period and the pressure was lowered to 2 mmnHg. These conditions were maintained for 10 minutes. The temperature was then raised to 310° C. over a five minute period and the pressure was reduced to 1.1 mmHg. These conditions,were maintained for 30 minutes after which the reactor was removed from the sand bath and the molten product polycarbonates was poured into a liquid nitrogen bath to quench the reaction.

Fries determination (ppm) was obtained by KOH mediated hydrolysis of the product polycarbonate followed by measurement of the amount of carboxy bisphenol A, V, present using HPLC.

Mn (Number average molecular weight) was obtained by GPC analysis of polycarbonate prepared by melt polymerization. Standards of polystyrene were used to construct a universal calibration against which polycarbonate could be measured using the Mark-Houwink equation. The temperature of the columns was 25° C. and the mobile phase was chloroform.

In Table 1 Comparative Examples are indicated as CE-1 through CE-6. "Onium Catalyst" identifies two organic onium ion transesterification catalysts, "TMAH" which stands for tetramethyl ammonium hydroxide used in Comparative Examples 1, 3, 5 and 6; and "TBPA" which stands for tetrabutyl phosphonium acetate. TMAH or TBPA was used in Comparative Examples 1–6 and in Examples 1–3 in an amount corresponding to $2.00 \times 10^{-4}$ moles of TMAH or TBPA per mole of bisphenol A. The column heading "NaOH Co-catalyst" indicates whether sodium hydroxide was used as a co-catalyst. The values given represent the number of moles of sodium hydroxide used per mole of bisphenol A. In Comparative Examples 3 and 4, the sodium hydroxide was added during stage 1 (the first reaction stage) of the polymerization reaction. In Comparative Examples 5 and 6 and in Examples 1–3, the sodium hydroxide co-catalyst was added in stage 2 (the second reaction stage) of the polymerization reaction. The column heading "$M_n$" represents the number average molecular weight of the product polycarbonate following stage two of the polymerization reaction and the values given are in Daltons. The column heading "[OH]" indicates the concentration of hydroxyl groups present in the product polycarbonate as determined by quantitative infrared spectroscopy. Values given are in parts per million. The column heading "% EC" indicates the percentage of product polycarbonate chain ends which are not hydroxyl groups. "Fries Level" indicates the amount of Fries product present in the product polymer. Values are in parts per million. The amount of Fries product present in the product polycarbonate was determined by completely hydrolysing said product polycarbonate and measuring the amount of carboxy bisphenol A, V, released.

TABLE 1

| Example | Onium Catalyst | NaOH Co-catalyst | $M_n$ | [OH] | % EC | Fries Level |
|---|---|---|---|---|---|---|
| CE-1 | TMAH | none | 675 | 30900 | — | — |
| CE-2 | TBPA | none | 6176 | 2360 | — | — |
| NaOH Co-catalyst added during stage 1 | | | | | | |
| CE-3 | TMAH | $1 \times 10^{-6}$ | 6883 | 653 | 86.8 | 700 |
| CE-4 | TBPA | $1 \times 10^{-6}$ | 7925 | 390 | 90.9 | — |
| NaOH Co-catalyst added during stage 2 | | | | | | |
| CE-5 | TMAH | $1 \times 10^{-6}$ | 7952 | 2330 | 45.5 | |
| CE-6 | TMAH | $0.5 \times 10^{-6}$ | 2387 | 3378 | 67 | |
| Example 1 | TBPA | $1 \times 10^{-6}$ | 8240 | 402 | 90.2 | 750 |
| Example 2 | TBPA | $0.5 \times 10^{-6}$ | 7634 | 286 | 93.6 | 216 |
| Example 3 | TBPA | $0.6 \times 10^{-6}$ | 8158 | 374 | 91 | 359 |

The results presented in Table 1 illustrate the superior performance of the tetraalkyl phosphonium carboxylate-sodium hydroxide catalyst combination when used according to the method of the present invention. The "late" addition of sodium hydroxide as a co-catalyst in the two stage process of the present invention provides higher molecular weights and higher percent endcapping (% EC) than is observed with alternate catalyst systems (Comparative Examples 1, 2, 3, 5, and 6) and alternate catalyst addition schemes (Comparative Example 4). In addition, reduced amounts of alkali metal hydroxide co-catalyst may be employed, thereby reducing the amount of Fries product present in the product polycarbonate. Comparison of Example 1 with Examples 2 and 3 reveals that significantly lower Fries product levels can be achieved by adjusting the amount of alkali metal hydroxide co-catalyst employed without sacrificing product polycarbonate molecular weight.

The invention has been described in detail with particular reference to preferred embodiments thereof, but it will be understood by those skilled in the art that variations and modifications can be effected within the spirit and scope of the invention.

What is claimed is:

1. A method of making polycarbonate comprising contacting at least one diaryl carbonate with at least one dihydroxy aromatic compound in the presence of at least one tetraalkyl phosphonium carboxylate transesterification catalyst in a first reaction stage to afford a mixture comprising an oligomeric polycarbonate, said oligomeric polycarbonate having a number average molecular weight of less than about 3000 Daltons, and a phenolic by-product, and thereafter, in a second reaction stage, adding at least one alkali metal hydroxide transesterification co-catalyst to said mixture to afford a product polycarbonate having a number average molecular weight of at least 7500 Daltons.

2. A method according to claim 1 wherein said first reaction stage comprises heating at a temperature between about 170 and about 280° C. and a pressure between about atmospheric pressure and about 10 mmHg.

3. A method according to claim 1 wherein said second reaction stage comprises heating at a temperature between about 260 and about 310° C. and a pressure between about 15 and about 0.1 mmHg.

4. A method according to claim 1 wherein said phenolic by-product is distilled from the mixture during the said first and second reaction stages.

5. A method according to claim 1 wherein said product polycarbonate comprises between about 100 and about 1000 parts per million Fries product.

6. A method according to claim 5 wherein said Fries product affords a carboxy bisphenol having structure I upon complete hydrolysis of the product polycarbonate,

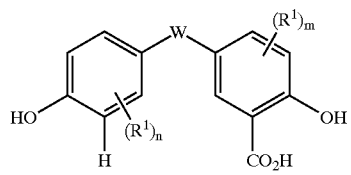

I wherein $R^1$ is at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–3; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

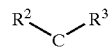

wherein $R^2$ and $R^3$ are independently a hydrogen atom, $C_1$–$C_2$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

7. A method according to claim 1 wherein said tetraalkly phosphonium carboxylate has structure II

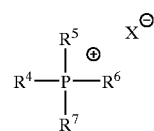

II wherein each of $R^4$–$R^7$ is independently a $C_1$–$C_{20}$ alkyl group and $X^-$ is an organic anion incorporating a carboxylate group.

8. A method according to claim 7 wherein said tetraalkyl phosphonium carboxylate is present in an amount equivalent to $1 \times 10^{-6}$ to $1 \times 10^{-3}$ moles per mole dihydroxy aromatic compound.

9. A method according to claim 7 wherein said anion is selected from the group consisting of formate, acetate, propionate, butyrate, benzoate, oxalate, malonate, succinate and terephthalate anions, and a mixture thereof.

10. A method according to claim 7 wherein said tetraalkly phosphonium carboxylate is tetrabutyl phosphonium acetate.

11. A method according to claim 1 wherein said alkali metal hydroxide is sodium hydroxide.

12. A method according to claim 1 wherein said alkali metal hydroxide is added in an amount equivalent to $1 \times 10^{-8}$ to $1 \times 10^{-5}$ moles per mole dihydroxy aromatic compound.

13. A method according to claim 1 where said dihydroxy aromatic compound is a bisphenol having structure III

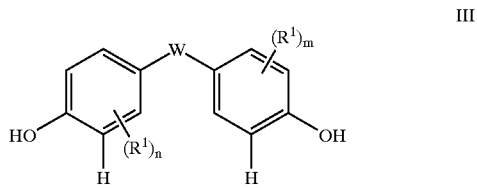

III wherein $R^1$ is at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–3; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

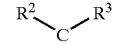

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

14. A method according to claim 13 wherein said dihydroxy aromatic compound is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

15. A method according to claim 1 wherein said diaryl carbonate has structure IV

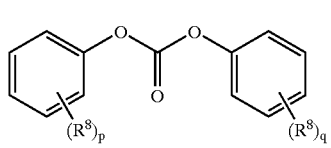

IV wherein $R^8$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; and p and q are independently integers 0–5.

16. A method according to claim 15 wherein said diaryl carbonate is selected from the group consisting of diphenyl carbonate, bis(4-methylphenyl) carbonate, bis(4-chlorophenyl) carbonate, bis(4-fluorophenyl) carbonate, bis(2-chlorophenyl) carbonate, bis(2-fluorophenyl) carbonate, bis(4-nitrophenyl) carbonate and bis(2-nitrophenyl) carbonate.

17. A method according th claim 1 wherein said product polycarbonate contains less than about 40 percent of polymer chains terminating in hydroxyl groups.

18. A method according to claim 1 wherein said diaryl carbonate is employed in an amount corresponding to between about 0.95 and about 1.20 moles diaryl carbonate per mole dihydroxy aromatic compound.

19. A method of making bisphenol A polycarbonate comprising contacting diphenyl carbonate and bisphenol A in the presence of at least one tetraalkyl phosphonium carboxylate transesterification catalyst in a first reaction stage to afford a mixture comprising an oligomeric bisphenol A polycarbonate, said oligomeric polycarbonate having a number average molecular weight of less than about 3000 Daltons, and phenol by-product, and thereafter, in a second reaction stage, adding at least one alkali metal hydroxide transesterification co-catalyst to said mixture to afford a product bisphenol A polycarbonate having a number average molecular weight of at least about 7500 Daltons.

20. A method according to claim 19 wherein said first reaction stage comprises heating at a temperature between about 170 and about 280° C. and a pressure between about atmospheric pressure and about 10 mmHg.

21. A method according to claim 19 wherein said second reaction stage comprises heating at a temperature between about 260 and about 310° C. and a pressure between about 15 and about 0.1 mmHg.

22. A method according to claim 19 wherein said phenol by-product is distilled from the mixture during the said first and second reaction stages.

23. A method according to claim 19 wherein said product bisphenol A polycarbonate comprises between about 100 and about 1000 parts per million Fries product.

24. A method according to claim 23 wherein said Fries product affords carboxy bisphenol V upon complete hydrolysis of the product bisphenol A polycarbonate.

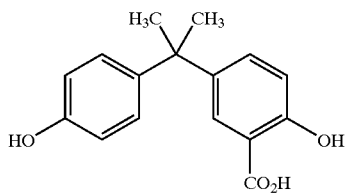

V

25. A method according to claim 19 wherein said tetraalkly phosphonium carboxylate has structure II

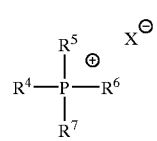

II wherein each of $R^4$–$R^7$ is independently a $C_1$–$C_{20}$ alkyl group and $X^-$ is an organic anion incorporating a carboxylate group.

26. A method according to claim 25 wherein said tetraalkyl phosphonium carboxylate is present in an amount equivalent to $1 \times 10^{-6}$ to $1 \times 10^{-3}$ moles per mole bisphenol A.

27. A method according to claim 25 wherein said anion is selected from the group consisting formate, acetate, propionate, butyrate, benzoate, oxalate, malonate, succinate, and terephthalate anions, and a mixture thereof.

28. A method according to claim 25 wherein said tetraalkly phosphonium carboxylate is tetrabutyl phosphonium acetate.

29. A method according to claim 19 wherein said alkali metal hydroxide is sodium hydroxide.

30. A method according to claim 19 wherein said alkali metal hydroxide is added in an amount equivalent to $1 \times 10^{-8}$ to $1 \times 10^{-5}$ moles per mole bisphenol A.

31. A method according to claim 19 wherein said diphenyl carbonate is employed in an amount corresponding to between about 0.95 and about 1.20 moles diaryl carbonate per mole bisphenol A.

\* \* \* \* \*